United States Patent [19]

Zimmermann et al.

[11] Patent Number: 4,928,004
[45] Date of Patent: May 22, 1990

[54] METHOD AND APPARATUS FOR SENSING STRAIN

[75] Inventors: Bernd D. Zimmermann, Hickory, N.C.; Richard O. Claus, Christiansburg; Kent A. Murphy, Roanoke, both of Va.

[73] Assignee: Center for Innovative Technology, Herndon, Va.

[21] Appl. No.: 210,890

[22] Filed: Jun. 20, 1988

[51] Int. Cl.$^5$ ............................ H01J 5/16; G01D 5/34
[52] U.S. Cl. ............................ 250/227.14; 250/231.1; 73/800; 356/32
[58] Field of Search ............... 250/231 R, 231 P, 227; 73/705, 800, 768; 356/73.1; 350/96.15

[56] References Cited

U.S. PATENT DOCUMENTS

| | | | |
|---|---|---|---|
| 4,477,725 | 10/1984 | Asawa et al. | 250/231 R |
| 4,654,520 | 3/1987 | Griffiths | 250/231 R |
| 4,713,538 | 12/1987 | Theocharous | 250/231 R |
| 4,734,577 | 3/1988 | Szuchy | 250/227 |
| 4,778,248 | 10/1988 | Arzur et al. | 356/73.1 |
| 4,806,012 | 2/1989 | Meltz et al. | 73/800 |
| 4,815,810 | 3/1989 | Betzler et al. | 350/96.21 |

FOREIGN PATENT DOCUMENTS

| | | | |
|---|---|---|---|
| 0119068 | 10/1978 | Japan | 356/73.1 |
| 0020835 | 1/1986 | Japan | 356/73.1 |
| 1560124 | 1/1980 | United Kingdom | 356/73.1 |

OTHER PUBLICATIONS

Barnoski et al., "Optical Time Domain Reflectometer," *Applied Optics*, vol. 16, No. 9, 9/77, pp. 2375–2379.
Wearden, "The Optical Time Domain Reflectometer," *Int. Fiber Optics*, vol. 2, No. 2, 3/81, pp. 41–44.

*Primary Examiner*—David C. Nelms
*Assistant Examiner*—Michael Messinger
*Attorney, Agent, or Firm*—Kenyon & Kenyon

[57] ABSTRACT

The present invention pertains to a strain sensor. The strain sensor is comprised of an optical waveguide, a device for providing optical pulses to the optical waveguide and a device for sensing localized strain in the optical waveguide. The sensing device determines shifts in arrival times of the optical pulses at the sensing device that correspond to the localized strain. In a preferred embodiment the sensing device includes a device for reflecting a portion of the optical pulses at predetermined positions in the optical waveguide and a device for detecting the shift in arrival times of the portion of the optical pulses which are reflected.

22 Claims, 1 Drawing Sheet

$L = i \times L_i \; (l_1 = l_2 = \cdots = L_i)$

METHOD AND APPARATUS FOR SENSING STRAIN

BACKGROUND AND DISCUSSION OF THE INVENTION

Optical fibers are commonly used in sensors. Typically, some form of energy that is desired to be sensed is received by the optical fiber. The energy causes changes in the optical fiber disposition, location, configuration that manifest themselves for example as microbends. Light being transmitted through the optical fiber experiences changes in amplitude or phase due to these changes.

Strain sensors have been developed to sense localized strain, that is, the strain present at discrete locations along the optical fiber. This localized strain corresponds to the energy present at a particular location along the fiber. One such strain sensor is described in U.S. Patent naming ASAWA et al 4,459,477 (herein after ASAWA et. al.) where optical pulses are transmitted into the optical fiber. Microbend transducers dispersed along the exterior of the optical fiber cause changes in amplitude in the transmitted optical pulses. The change in amplitude experienced by the optical pulses corresponds to the energy present with respect to a microbend transducer in a localized portion of the optical fiber. However, significant problems with the use of microbend transducers in optical fibers are the large power losses, transient effects and complex apparatus required to measure the strain.

Another patent that relies on discontinuities to measure strain is U.S. Pat. No. 4,653,916 to Henning et al. (hereinafter Henning et al.). Henning et al. and ASAWA et. al. rely in discontinuities which are produced by external means such as a transducers 14 in ASAWA et. al. This is a relatively complex, burdensome and obtrusive system requiring extensive external apparatus to measure localized strain. Because the discontinuities are largely external, strain at various locations throughout the cross-section of a structure cannot be measured. In the invention disclosed herein, the system of optical fibers and splices can be located throughout the cross-section of a structure to yield an array of strain measurements. This is accomplished without the type of power loss constraints that other sensors have heretofore experienced.

The strain sensor of the invention is comprised of an optical waveguide utilized with a source for providing optical pulses to the waveguide and a system for sensing localized strain in the optical waveguide. The sensing system measures changes in arrival times of the optical pulses, which shifts correspond to the localized strain. In a preferred embodiment the sensing means includes reflecting a portion of the optical pulses at predetermined positions along the optical waveguide and detecting the shift in arrival times of the reflected optical pulses.

In utilizing the splices and wave guides of the invention, portions of the sensing system imbedded can actually be in added in the structure to be measured often without adversely affecting its structural integrity. Furthermore, the efficiency with which the system operates renders it more economical to the user and more amenable for use with various structures.

The above is a brief description of the deficiencies of the prior art and advantages of the invention. Other advantages will be apparent from the Detailed Description of the Preferred Embodiment which follows.

DESCRIPTION OF THE PREFERRED EMBODIMENTS

Figure 1:
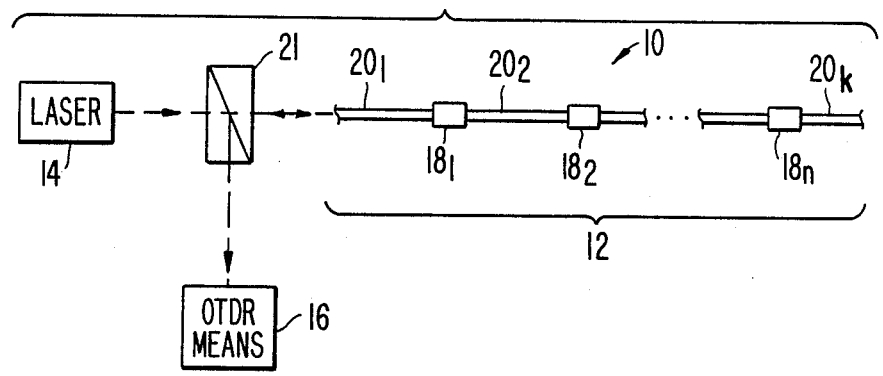
FIG. 1 is a schematic representation of a localized strain sensor.

Referring now to the drawings, wherein like reference numerals designate identical and corresponding parts throughout the several views, and more particularly to FIG. 1 thereof, there is shown a strain sensor 10 which includes optical waveguide 12. Strain sensor 10 is also comprised of means 14 for generating optical pulses to the optical waveguide 10. Preferably, the pulse generating means is a laser, but other types of optical pulse generators may be employed. Additionally, the strain sensor 10 is comprised of means for sensing localized strain in the optical waveguide 10. This system measures the time sequence of optical pulses from various positions along the waveguide. Changes in the time sequence are a function of strain at a particular location. By correlating the change in time sequence, with length or certain fiber dimensions, one can arrive at a strain measurement.

The sensing apparatus preferably includes means for reflecting a portion of the optical pulses at predetermined positions in optical waveguide 12 and detecting the shift in arrival times of the reflected optical pulses. Such a system is referred to herein as optical time domain reflectometry (OTDR) means 16.

The reflecting means includes a number n of optical splices 18 connected to the optical waveguide 12, where n is an integer and greater than or equal to 1. The optical waveguide 10 includes k optical fibers 20 connected in series by the n optical splices 18, where k is an integer greater than or equal to 1.

Figure 2:
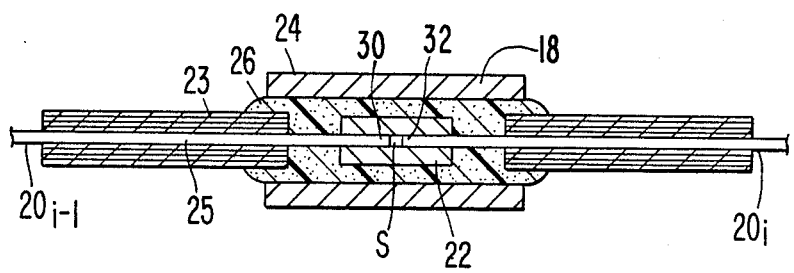
FIG. 2 is a schematic representation of a partially reflective optical fiber splice.

Each splice 18 includes an alignment sleeve 22, as shown in FIG. 2, for receiving two optical fibers 20 and aligning them such that a portion of an optical pulse passes therebetween and a portion of the optical pulse is reflected. As can be seen from FIG. 2 splice 18 permits two waveguides, in this case optical fibers, to be arranged in colinear relationship with their ends 30, 32 slightly spaced by gaps. This arrangement effects a reflection of a portion of an optical pulse while transmitting the remaining portion through the interface of the fibers.

Preferably, each optical fiber 20 has a portion of its optical fiber coating 23 removed so only the optical fiber core 25 of the optical fiber 20 is received by alignment sleeve 22. Each splice 18 also includes an encapsulating strain relief tube 24 which houses alignment sleeve 22. Epoxy 26 is applied to a portion of exterior surface 23 which couples the two optical fibers 18 into the encapsulating strain relief tube 24. With this configuration the fibers will be fixed relative to each other so that the air gaps do not change. Otherwise false readings may occur as a result of a change in the gap dimension. The epoxy 26 and the alignment sleeve 22 are made out of a material whose index of refraction is such that essentially total internal reflection is maintained in the optical fibers 20 disposed in the splice 18 and in the space S between the optical fibers 20 in the alignment sleeve 22. In this embodiment the epoxy that meets these requirements are Tracon or Epotek 354. The elastomer for the alignment sleeve is Sygard 184. Other materials may be used so long as they achieve the characteristics noted above.

Encapsulating strain relief tube 24 is impervious to most substantial external forces. Consequently, losses are minimized or eliminated. In this instance encapsulating tube 24 is a stainless steel tube; however, other dielectric material can be used as well. With this configuration essentially a constant percentage of each optical pulse is reflected as it passes through the encapsulating strain relief tube 24 regardless of the conditions external to the encapsulating strain relief tube 24.

In this preferred embodiment the splice is configured to have size which makes it amenable to be imbedded in most structures where it is needed to measure strain, particularly in those instances where a number of positions throughout the structure should be measured. As shown in FIG. 2, tube 24 is a right circular cylinder with a diameter of about 1.2 mm and a length of about 1.9 cm. Alignment sleeve 22 has a length of about 0.6 cm and a diameter which is the same as the fiber coating or about 0.5 mm. The remaining volume within tube 24 is filed with epoxy 26.

With this configuration a number of optical fibers can be joined by splices 18 in a colinear relationship to form a string 12. A number of strings 12 can be arranged in parallel planes and other positions throughout the structure. As a result the structure when subjected to a load, number of positions corresponding to the location of the splices are available for measuring the strain on the structure.

In the operation of the invention, an optical pulse from a laser is launched into optical fiber $20_1$. The optical pulse travels down the optical fiber $20_1$ until it reaches the first splice $18_1$. A certain percentage of the optical pulse is then reflected back toward the launching end of the optical fiber 20, while the unreflected portion of the pulse continues into optical fiber $20_2$.

The portion of the optical pulse reflected by the first splice $18_1$ emerges from the launching end of optical fiber $20_1$ and is directed by beam splitter 21 which in turn reflects a portion of the beam to OTDR means 16. For a more complete discussion of optical time domain reflectometry (OTDR), see U.S. Pat. No. 4,653,916 issued in Mar. 31, 1987 naming Henning et al. as inventors which patent is incorporated therein by reference. The OTDR means 16 determines the difference in time it takes the optical pulse to travel from the laser to the first splice $18_1$, where a portion of it is reflected, and for the reflected portion to travel back to the OTDR means 16; as compared to the time it takes an optical pulse to travel the same path when there is a known strain present in the optical fiber $20_1$. This difference in time corresponds to the localized strain relative to the known localized strain, and is essentially the result of the different length that the optical pulse must travel due to the localized strain varying the length of the optical fiber $20_1$. Preferably, the known strain is zero that the unknown strain is compared against.

The portion of the optical pulse that is not reflected by the first splice $18_1$ continues to optical fiber $20_2$ until it reaches the second splice $18_2$. At the second splice $18_2$ the optical pulse again has a portion reflected back towards the launching end of optical fiber $20_1$, and an unreflected portion that continues through the second splice $18_2$ into optical fiber $20_3$ which is downstream of splice $18_2$.

The reflected portion of the optical pulse from splice $18_2$ returns through splice $18_1$, and optical fiber $20_1$ to the beam splitter 21 where it is directed to be received by the OTDR means 16. The OTDR means 16, for example, subtracts the time $T_1$ it takes the optical pulse to travel to the OTDR means 16 via a portion of the optical pulse being reflected by the first splice $18_1$, from the time $T_2$ it takes the optical pulse to travel to the OTDR means 16 via a portion of the optical pulse being reflected by the second splice $18_2$. The difference in these times $(T_2 - T_1)$ is essentially the time it takes the optical pulse to travel from the first splice $18_1$ to the second splice $18_2$ and back to the first splice $18_1$. By subtracting the time $T_1$ from the time $T_2$ localized strain effects on the optical fiber $20_1$ are removed from consideration in the determination of localized strain with respect to optical fiber $20_2$. In other words, the determination of localized strain on optical fiber $20_2$ does not include the effects of localized strain on optical fiber $20_1$. The difference in time $(T_2 - T_1)$ is then compared to the time corresponding to an optical pulse traveling the same path but associated with a known localized strain with respect to optical fiber $20_2$. The difference in the time $T_2 - T_1$ and the known time corresponds to the localized strain with respect to optical fiber $20_2$ relative to a known strain with respect to optical fiber $20_2$. As mentioned above, preferably the known strain is zero, so the localized strain is the actual strain with respect to optical fiber $20_2$. The difference in the time $T_2 - T_1$ of the known time corresponds to the difference in length of optical fiber $20_2$ with respect to the localized strain relative to a known localized strain.

The above description of the operation concerning splices $18_1$ and $18_2$ and strain and optical fibers $20_1$ and $20_2$ is applicable for each splice 18 downstream from splice $18_2$ and each optical fiber 20 downstream from optical fiber $20_2$. In general, the time $T_{i-1}$ it takes an optical pulse to travel from the laser to a splice $18_{i-1}$ and from the splice $18_{i-1}$, upon reflection, to the OTDR means 16 is subtracted from the time $T_i$ it takes the optical pulse to travel from the laser to the optical splice $18_i$ and from the splice $18_i$, upon reflection, to the OTDR means 16. In each case the difference in time $T_i - T_{i-1}$ corresponds to the time it takes an optical pulse to travel from a splice $18_{i-1}$ to a splice $18_i$ and back to spline $18_{i-1}$ via optical fiber $20_i$. This time $T_i - T_{i-1}$ is then compared to the time it takes an optical pulse to travel from a splice $18_{i-1}$ to a splice $18_i$ and then back to a splice $18_{i-1}$ subject to a known localized strain on the optical fiber $20_i$ optically connecting splice $18_{i-1}$ and splice $18_i$. The times associate with the known strain about optical fiber $20_i$ and the unknown strain about $20_i$ are compared and the difference therebetween corresponds to the localized strain relative to the non-localized strain in an optical fiber $20_i$.

Figure 3:
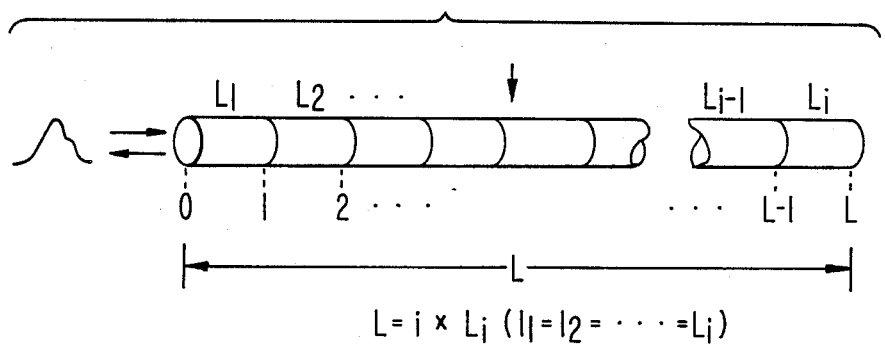
FIG. 3 is a schematic representation of an optical waveguide divided into discrete sections.

The relationship of time, length and strain with respect to an optical fiber 20 is now more fully described. To facilitate understanding of these relationships, and referring to FIG. 3 which schematically represents the optical waveguide 12 comprised of optical fibers 20 connected in series by splices 18, the optical waveguide 12 is divided into discrete sections $L_1$ through $L_i$. For simplicity, the entire length of the optical waveguide 12 is equal to the number of sections i times the length of each section, where $L_1 = L_2 = \ldots = L_i$. The length $L_i$ of section i is related to the arrival times $t_{i-1}$ and $t_i$ of its near end 36 and far end 38 reflected pulses at the OTDR means 16 by:

$$L_i = (\tfrac{1}{2}) \cdot \left(\frac{c}{n}\right) \cdot (t_i - t_{i-1}), \tag{1}$$

where c is the speed of light and n is the average index of reflection of the fiber core 25. As the individual optical fiber 20 is stained the length $L_i$ of section i varies by:

$$dL_i = \left(\frac{c}{2}\right) \cdot \left(\frac{nd(t_i - t_{i-1}) - (t_i - t_{i-1})dn}{n^2}\right). \tag{2}$$

The strain in the ith section is then given by:

$$\epsilon_{f,i} = \frac{dL_i}{L_i} = \frac{d(t_i - t_{i-1})}{(t_i - t_{i-1})} - \frac{dn}{n}. \tag{3}$$

Note that Equation (3) takes into consideration the change in refractive index of the fiber core 25 as strain is applied. Since n varies linearly with strain, Equation (3) can be rewritten as:

$$\epsilon_{f,i} = \left(\frac{\Delta t_i - \Delta t_{i-1}}{t_i - t_{i-1}}\right) \cdot \left(\frac{1}{1+a}\right). \tag{4}$$

In Equation (4) a denotes the slope of the n vs $E_f$ curve. G. W. Scherer "stress induced index profile distribution and optical waveguides", Appl. Opt., Vol. 19, No. 12, 1980, pp. 2006; and C. D. Butter, G. B. Hocker, "fiber optic strain gage", Appl. Opt., No. 19, 1978, pp. 2067-2069 give expressions for a, however, it is preferable to determine a experimentally for the particular type of optical fiber used in order to insure accuracy. Also, note the delta notation used in Equation (4) to represent changes in optical pulse arrival times at the OTDR means 16. These delta changes are the quantities which are measured by the sensor 10 to determine the applied strain in section i.

In order to define a power budget which dictates the actual number of splices that can be used for a given dynamic range, the average forward power loss per slice must be calculated. This loss is given by:

$$L_{sp} = 10 \log\left[(1-p) \cdot \left(\frac{r}{r + S\tan(\sin^{-1}(NA))}\right)^2\right] dB. \tag{5}$$

In Equation (5) p denotes the reflection coefficient between the fiber and the gap medium (typically air), and is given by:

$$p = \left(\frac{n-1}{n+1}\right)^2. \tag{6}$$

S is the average gas distance, r is the fiber core 25 radius, and NA is the numerical aperture of the fiber.

The average two-way power loss which determines the power reaching the OTDR means after n splices 18 is given by:

$$L_{2way} = 2nL_{sp} + 10 \log (p(1-p)) \text{ db} \tag{7}$$

Equation (7) allows the determination of the maximum number of splices 18 by equating $L_{2way}$ to the dynamic range of the OTDR means 16. Note that two way power loss must be considered since optical pulses reflected by splice $18_i$ pass back through splices $18_1$ thru $18_{i-1}$ before reaching the OTDR means 16.

The above system is particularly amenable to measuring the strain of a structure at various points throughout the structure cross-section. Because of the size and efficiency of the elements employed the waveguides and splices can actually be embedded in the structure to be sensed. By using the OTDR method discussed above the strain at a number of locations can be obtained without unnecessarily weakening the structure. Where a multi-dimensional array of spliced fibers are employed a three dimensional analysis can be obtained.

Although the invention has been described in detail in the foregoing for the purpose of illustration, it is to be understood that such detail is solely for that purpose and that variation can be made therein by those other than the art without departing from the spirit and scope of the invention as described in the following claims.

What is claimed is:

1. A strain sensor comprising:
   (a) at least two optical waveguides separated by an air gap in a colinear relationship;
   (b) a splice for fixing said waveguides in said relationship with said gap;
   (c) means for generating optical pulses into the optical waveguides; and
   (d) a structure in which localized strains are to be sensed;
   (e) said optical waveguides and said splice being imbedded in said structure;
   (f) means for sensing localized strain in said structure by determining shifts in arrival times of the optical pulses reflected at said splice by the sensing means that correspond to the localized strain.

2. A sensor as described in claim 1 wherein said splice and optical waveguides cooperate to reflect a portion of the optical pulses; and means for detecting the shift in arrival times of the portion of the optical pulses which are reflected.

3. A sensor as described in claim 2 further comprising n splices connected to the optical waveguides such that each splice reflects a portion of each optical pulse in the optical waveguides, and n being an integer $\geq 1$.

4. A sensor as described in claim 3 wherein said optical waveguides includes k optical fibers connected in series by the n splices, and k being an integer $\geq 1$.

5. A sensor as described in claim 5 wherein the detecting means includes an optical time domain reflectometry means.

6. A sensor as described in claim 6 wherein each splice includes an alignment sleeve for receiving two optical fibers and aligning them such that a portion of the optical pulse passes therebetween and a portion of the optical pulse is reflected, an encapsulating strain relief tube housing the alignment sleeve, and epoxy which couples the 2 optical fibers to the encapsulating strain relief tube.

7. A method of sensing strain in a structure comprising:
   (a) arranging portions of at least two optical waveguides in substantially colinear relationship with ends of said optical waveguides in spaced relationship;

(b) fixing said portions within a splice to maintain said optical waveguides in said relationship;

(c) imbedding said splice and said optical waveguides in said structure with a portion of at least one waveguide exposed;

(d) imparting optical pulses to the exposed portion of said optical waveguide;

(e) a portion of said pulse being reflected at said splice (f) sensing the reflected portion of said pulse at said exposed portions; and (g) measuring time intervals between said pulse and said reflected pulse.

8. The method according to claim 7 wherein said imparting step includes launching an optical pulse from a laser.

9. The method according to claim 8 wherein said sensing step includes splitting said reflected pulse emerging from the said exposed portion of said optical waveguide and measuring said split reflected pulse.

10. The method according to claim 9 wherein said measuring step includes measuring time intervals between pulses sensed by said launching step and reflected pulse from said splitting step.

11. The method according to claim 10 wherein a number of optical waveguides are spliced together with their ends in spaced relationship and the waveguides being colinear, and said imbedding step including imbedding all of said optical waveguides in said structure.

12. The method according to claim 11 wherein said reflecting step includes reflecting a portion of said pulse from each position in said structure where a splice is located.

13. The method according to claim 12 wherein said optical waveguides are optical fibers.

14. The method according to claim 13 wherein said optical fibers are arranged in each splice with an air gap which ranges between than 5 microns and about 50 microns.

15. The method according to claim 13 wherein the ratio of the diameter of said splice to said fiber with coating thereon is about two (2).

16. The method according to claim 14 wherein said splice includes a material surrounding said optical fibers includes an index of refraction to maintain substantially total internal reflection.

17. A method for sensing strain in a structure comprising:

(a) arranging a number of optical fibers in substantially colinear relationship with the ends of said fibers in spaced relationship from adjacent fibers wherein said space is less than about 50 microns;

(b) fixing said ends within a splice to maintain said fibers in said spaced relationship and surrounding said ends within said splice with material to maintain substantially total internal reflection;

(c) imbedding said optical fibers in a structure with at least one of the ends of said fibers not fixed in a splice exposed;

(d) imparting optical pulses to said exposed portion of said fiber from a laser source;

(e) reflecting a portion of said pulse at each of said splices;

(f) splitting at least a portion of reflected pulses and said optical pulse from said laser;

(g) sensing said optical pulses and said reflected pulses from said splitting step; and (h) measuring the time intervals between said imparting step and said reflecting step as sensed from said splitting step.

18. An apparatus for measuring strain in a structure comprising:

(a) a number of optical fibers, with each fiber having ends, said ends of said fibers being held together in spaced relationship by a splice wherein space between said ends is less than about 50 microns and at least one end of said fibers being exposed;

(b) said splice including an outer tube, an alignment sleeve within said outer tube for aligning said ends in said colinear and spaced relationship and an epoxy for securing said sleeve and said fibers within said tube, said epoxy and said alignment sleeve being of a material to maintain substantially total internal reflection;

(c) said fibers forming a string of predetermined length, said string being imbedded in said structure with said one exposed end exposed for launching optical pulses into said string;

(d) laser means arranged adjacent to said exposed end for launching optical pulses into said string;

(e) means for sensing pulses from said laser means end reflected pulses from said exposed end of said string;

(f) a beam splitter located between said laser means for directing at least a portion of said reflected pulse and said optical pulse to said sensing means; and (g) measuring means connected to said sensing means for measuring the time intervals between said optical pulse and said reflected pulse.

19. The apparatus according to claim 18 further comprising a number of strings of fibers being imbedded in said with each string having at least one exposed end for launching optical pulses into said strings.

20. The apparatus according to claims 17, 18 or 19 wherein each optical fiber includes a coating, a portion of said coating being removed at said ends in said splice; said alignment sleeve in said splice being configured to align said exposed portions of adjacent fibers in colinear relationship.

21. The apparatus according to claim 20 wherein the cross section of said splice is substantially constant and the ratio of the diameter of said splice to said fiber with fiber coating thereon is about 2.4.

22. The apparatus according to claim 21 wherein said encapsulating tube is about 1.9 cm in length and has diameter of about 1.2 mm; said fiber and coating has a diameter of about 0.5 mm; said alignment sleeve has a length of about 0.6 cm and a diameter of about 0.5 mm.

* * * * *